United States Patent
Shimazu et al.

(10) Patent No.: US 9,821,806 B2
(45) Date of Patent: Nov. 21, 2017

(54) CONTROL APPARATUS FOR VEHICLE

(71) Applicant: TOYOTA JIDOSHA KABUSHIKI KAISHA, Toyota-shi, Aichi-ken (JP)

(72) Inventors: Takuro Shimazu, Miyoshi (JP); Mitsuhiro Fukao, Toyota (JP); Hiromitsu Nitani, Nagakute (JP); Akira Hino, Toyota (JP); Hiroki Kondo, Miyoshi (JP); Atsushi Ayabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/318,460

(22) PCT Filed: Jul. 7, 2015

(86) PCT No.: PCT/IB2015/001133
§ 371 (c)(1),
(2) Date: Dec. 13, 2016

(87) PCT Pub. No.: WO2016/005807
PCT Pub. Date: Jan. 14, 2016

(65) Prior Publication Data
US 2017/0151949 A1 Jun. 1, 2017

(30) Foreign Application Priority Data
Jul. 7, 2014 (JP) .................................. 2014-140081

(51) Int. Cl.
*B60W 10/06* (2006.01)
*B60W 10/107* (2012.01)
(Continued)

(52) U.S. Cl.
CPC .......... *B60W 30/181* (2013.01); *B60W 10/06* (2013.01); *B60W 10/107* (2013.01);
(Continued)

(58) Field of Classification Search
CPC .... B60W 10/06; B60W 10/107; B60W 10/11; B60W 30/181; B60W 2510/1005; B60W 2520/04; B60W 2710/1005
See application file for complete search history.

(56) References Cited

U.S. PATENT DOCUMENTS 6,388,407 B1 * 5/2002 Eguchi .................... B60K 6/48
180/65.25
6,422,972 B1 * 7/2002 Eguchi .................. B60K 6/485
477/107
(Continued)

FOREIGN PATENT DOCUMENTS

| JP | 2013-189952 A | 9/2013 |
| JP | 2013-253480 A | 12/2013 |
| WO | 2013/176208 A1 | 11/2013 |

*Primary Examiner* — Edwin A Young
(74) *Attorney, Agent, or Firm* — Oliff PLC

(57) ABSTRACT

When neutral control is started by placing a CVT drive clutch in a semi-engaged state while a vehicle is decelerating in a state where a second power transmission path is established, a clutch mechanism that is semi-engaged in neutral control while the vehicle is decelerating is changed from the CVT drive clutch to a forward clutch before a stop of the vehicle, so it is possible to continue the neutral control until a stop of the vehicle. At a stop of the vehicle, a power transmission path is already changed to a first power transmission path that establishes a gear ratio (EL) higher than a highest gear ratio (γmax) that can be established by the second power transmission path. Thus, right after a stop of the vehicle, it is possible to execute idle stop control.

5 Claims, 5 Drawing Sheets

(51) Int. Cl.
*B60W 30/18* (2012.01)
*F16H 37/08* (2006.01)

(52) U.S. Cl.
CPC . *F16H 37/0846* (2013.01); *B60W 2510/1005* (2013.01); *B60W 2520/04* (2013.01); *B60W 2520/10* (2013.01); *B60W 2520/105* (2013.01); *B60W 2710/1005* (2013.01)

(56) References Cited

U.S. PATENT DOCUMENTS

2012/0053012 A1* 3/2012 Yamada ................ B60W 10/02
477/46
2015/0087463 A1 3/2015 Nakagawa et al.

\* cited by examiner

CONTROL APPARATUS FOR VEHICLE

BACKGROUND OF THE INVENTION

1. Field of the Invention

The invention relates to a control apparatus for a vehicle including a continuously variable transmission mechanism and a gear mechanism provided in parallel with each other between an engine and a drive wheel.

2. Description of Related Art

There is well known a power transmission system including a continuously variable transmission mechanism and a gear mechanism provided in parallel with each other between an input rotating member and an output rotating member. The gear mechanism has a gear stage. The power of an engine is transmitted to the input rotating member. The output rotating member outputs the power to a drive wheel. This is, for example, a power transmission system for a vehicle, described in International Application Publication No. 2013/176208. International Application Publication No. 2013/176208 describes the power transmission system for a vehicle, including a power transmission path through a belt-type continuously variable transmission and a power transmission path through a gear train. The power transmission paths are provided in parallel with each other between an input shaft and an output shaft. A first clutch is provided in the power transmission path through the gear train. The first clutch transmits or interrupts power. A second clutch is provided in the power transmission path through the continuously variable transmission. The second clutch transmits or interrupts power. In this power transmission system for a vehicle, the speed ratio of the power transmission path through the gear train is set so as to be higher than the lowest vehicle speed gear ratio (maximum speed ratio) that can be established by the power transmission path through the continuously variable transmission. Thus, when the vehicle starts moving, the first clutch is engaged, and the power of the engine is transmitted by the power transmission path through the gear train, with the result that the vehicle is driven. On one hand, as described in Japanese Patent Application Publication No. 2013-253480 (JP 2013-253480 A), there is a well known neutral control technique for improving fuel economy. In neutral control, while a vehicle is decelerating, an engine load is reduced by placing a clutch, provided in a power transmission path, in a semi-engaged state. On the other hand, there is also a well known idle stop control for temporarily stopping an engine at the time when a vehicle comes to a stop. In this idle stop control, as described in Japanese Patent Application Publication No. 2013-189952 (JP 2013-189952 A), in consideration of drivability (for example, power performance) at the restart of a vehicle, the engine is made to stop when the speed ratio of a transmission is close to the maximum speed ratio.

SUMMARY OF THE INVENTION

Incidentally, in a vehicle that includes a power transmission system in which a continuously variable transmission mechanism and a gear mechanism are provided in parallel with each other between input and output rotating members and that executes neutral control or idle stop control on the basis of a predetermined condition, it is conceivable that the vehicle executes the neutral control by placing a second clutch in a semi-engaged state while the vehicle is decelerating in a state where a power transmission path through a continuously variable transmission is established by engaging the second clutch. In addition, it is conceivable that the vehicle comes to a stop while the neutral control is being executed. When the predetermined condition is satisfied after a vehicle stop, the idle stop control is executed. When the idle stop control is executed after a vehicle stop in a state where the neutral control is being executed, it is desirable to change the power transmission path to a power transmission path through the gear mechanism, having a larger low vehicle speed gear ratio than the maximum speed ratio that can be established by the power transmission path through the continuously variable transmission in advance of the idle stop control. Thus, it is possible to avoid shortage of driving force at a restart. However, an engine does not stop right after a vehicle stop, so it is disadvantageous in terms of fuel economy. The above-described inconvenience is not publicly known.

The invention provides a control apparatus that, in a vehicle including a continuously variable transmission mechanism and a gear mechanism in parallel with each other between an input rotating member and an output rotating member, is able to suppress deterioration of fuel economy when neutral control is started while the vehicle is decelerating in a state where a second power transmission path through the continuously variable transmission mechanism is established.

An aspect of the invention provides a control apparatus for a vehicle. The vehicle includes an engine, a drive wheel, and a power transmission system. The power transmission system includes an input rotating member, an output rotating member, a continuously variable transmission, a gear mechanism, and a clutch mechanism. Power of the engine is transmitted to the input rotating member. The output rotating member is configured to output the power to the drive wheel. The continuously variable transmission is provided between the input rotating member and the output rotating member. The gear mechanism is provided in parallel with the continuously variable transmission between the input rotating member and the output rotating member. The gear mechanism includes a gear stage. The clutch mechanism is configured to selectively change a power transmission path between a first path and a second path. The clutch mechanism includes a first clutch and a second clutch. The first path is a path configured to, when the first clutch is engaged, transmit the power of the engine to the drive wheel via the gear mechanism. The second path is a path configured to, when the second clutch is engaged, transmit the power of the engine to the drive wheel via the continuously variable transmission. A speed ratio at the time when the power of the engine is transmitted by the first path is a low vehicle speed-side speed ratio larger than a lowest vehicle speed-side speed ratio at the time when the power of the engine is transmitted by the second path. The control apparatus includes at least one electronic control unit configured to i) execute neutral control for limiting transmission of power through the power transmission path by placing the clutch mechanism in a semi-engaged state and idle stop control for temporarily stopping the engine during a stop of the vehicle on the basis of a predetermined condition, and ii) when the neutral control for the second power transmission path is started by placing the engaged second clutch in a semi-engaged state while the vehicle is decelerating in a state where the power is being transmitted via the second path, shift into the neutral control for the first path by releasing the second clutch and placing the released first clutch in a semi-engaged state before a stop of the vehicle.

With this configuration, when the neutral control is started by placing the second clutch in a semi-engaged state while the vehicle is decelerating in a state where the second path is established, the clutch mechanism that is placed in a semi-engaged state in the neutral control while the vehicle is decelerating is changed from the second clutch to the first clutch before a stop of the vehicle. Therefore, it is possible to continue the neutral control until a stop of the vehicle. At a stop of the vehicle, the power transmission path that transmits the power of the engine toward the drive wheel is already changed to the first path that establishes the low vehicle speed gear ratio larger than the lowest vehicle speed gear ratio that can be established by the second path. Thus, right after a stop of the vehicle, it is possible to execute the idle stop control for causing the engine to stop. Thus, in the vehicle including the continuously variable transmission mechanism and the gear mechanism in parallel with each other between the input rotating member and the output rotating member, when the neutral control is started while the vehicle is decelerating in a state where the second path through the continuously variable transmission mechanism is established, it is possible to suppress deterioration of fuel economy.

In the above aspect, the electronic control unit may be configured to, when a vehicle speed is lower than or equal to a predetermined vehicle speed while the neutral control for the second path is being executed, shift from the neutral control for the second path to the neutral control for the first path. With this configuration, the clutch mechanism that is placed in a semi-engaged state in the neutral control while the vehicle is decelerating is appropriately changed from the second clutch to the first clutch before a stop of the vehicle.

In the above aspect, the electronic control unit may be configured to, when the idle stop control is executed after a stop of the vehicle, cancel the neutral control for the first path. With this configuration, it is possible to prepare for a restart.

In the above aspect, the electronic control unit may be configured to, in a state where a speed ratio of the continuously variable transmission mechanism is a high vehicle speed gear ratio smaller than the lowest vehicle speed gear ratio that is established by the continuously variable transmission mechanism, shift from the neutral control for the second path to the neutral control for the first path. With this configuration, by changing the clutch mechanism that is placed in a semi-engaged state in the neutral control while the vehicle is decelerating from the second clutch to the first clutch without returning the speed ratio of the continuously variable transmission mechanism to a maximum speed ratio, it is possible to increase the probability that the change of the clutch mechanism that is placed in a semi-engaged state completes before a stop of the vehicle (before the neutral control is cancelled). That is, it is possible to increase the probability that the idle stop control is started right after a stop of the vehicle.

In the above aspect, the electronic control unit may be configured to, after shifting from the neutral control for the second path to the neutral control for the first path, change the speed ratio of the continuously variable transmission toward the lowest vehicle speed gear ratio. With this configuration, it is possible to increase the probability that the speed ratio of the continuously variable transmission mechanism is returned to the maximum speed ratio before a stop of the vehicle, so it is possible to prepare for a change of the power transmission path from the first path to the second path after a restart.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
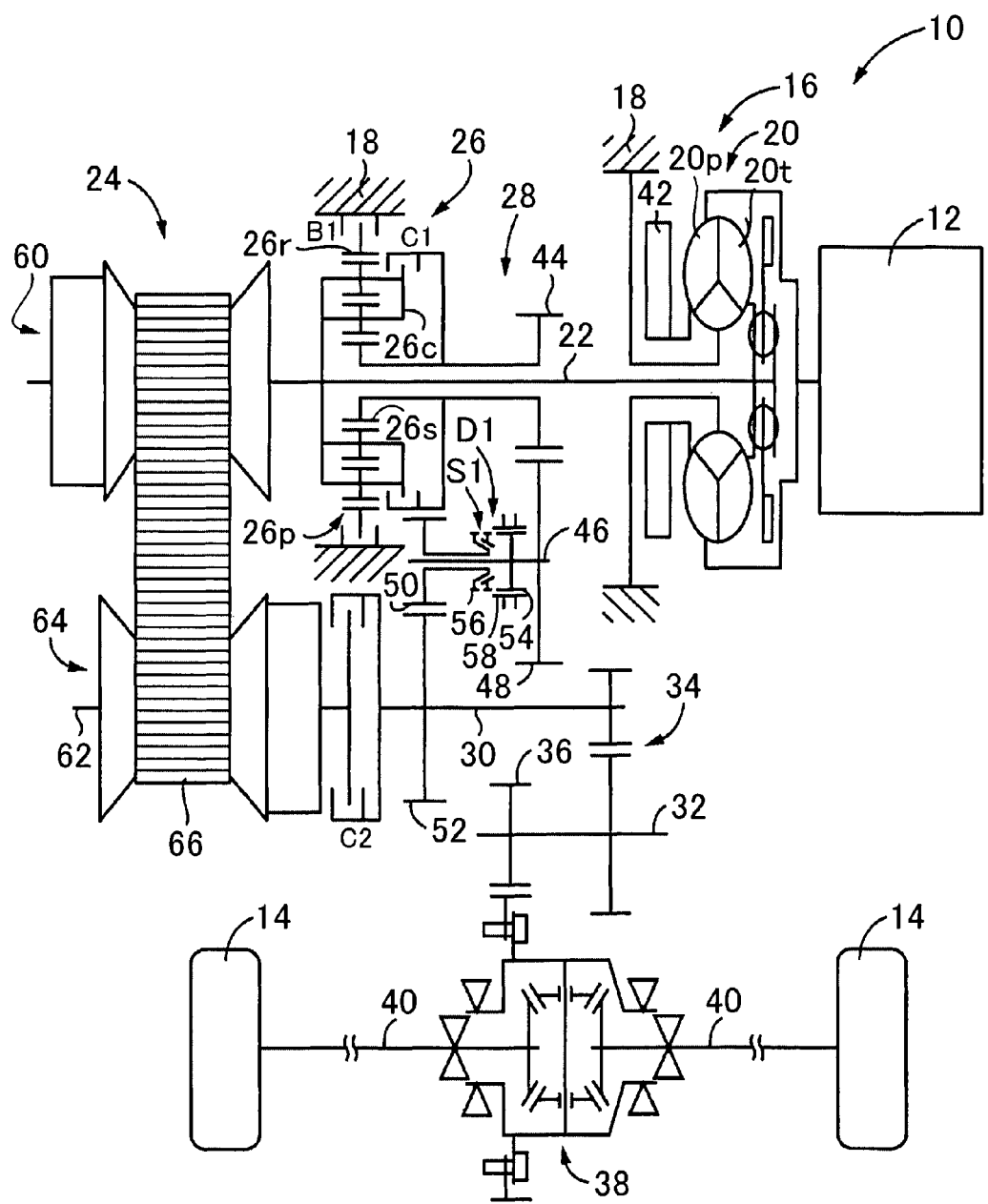
FIG. 1 is a view that illustrates the schematic configuration of a vehicle to which the invention is applied.

FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is coupled to the torque converter 20. The continuously variable transmission 24 is coupled to the input shaft 22. The continuously variable transmission 24 serves as a continuously variable transmission mechanism. The forward/reverse switching device 26 is also coupled to the input shaft 22. The gear mechanism 28 is coupled to the input shaft 22 via the forward/reverse switching device 26. The gear mechanism 28 is provided in parallel with the continuously variable transmission 24. The output shaft 30 is an output rotating member common to the continuously variable transmission 24 and the gear mechanism 28. The reduction gear unit 34 is formed of a pair of gears. The pair of gears are respectively provided on the output shaft 30 and the counter shaft 32 so as to be relatively non-rotatable, and are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, the power of the engine 12 (when not specifically distinguished from one another, power is synonymous with torque and force) is transmitted to the pair of drive wheels 14 sequentially via the torque converter 20, the continuously variable transmission 24 (or the forward/reverse switching device 26 and the gear mechanism 28), the reduction gear unit 34, the differential gear 38, the axles 40, and the like.

In this way, the power transmission system 16 includes the continuously variable transmission 24 and the gear mechanism 28 provided in parallel with each other between the engine 12 (which is synonymous with the input shaft 22 that is an input rotating member to which the power of the engine 12 is transmitted) and the drive wheels 14 (which are synonymous with the output shaft 30 that is an output rotating member that outputs the power of the engine 12 to the drive wheels 14). Thus, the power transmission system 16 includes a first power transmission path and a second power transmission path. The first power transmission path transmits the power of the engine 12 from the input shaft 22 to the drive wheels 14 side (that is, the output shaft 30) via the gear mechanism 28. The second power transmission path transmits the power of the engine 12 from the input shaft 22 to the drive wheels 14 side (that is, the output shaft 30) via the continuously variable transmission 24. The power transmission system 16 is configured to change the power transmission path between the first power transmission path and the second power transmission path on the basis of a traveling state of the vehicle 10. Therefore, the power transmission system 16 includes clutch mechanisms that selectively change the power transmission path, which transmits the power of the engine 12 to the drive wheels 14 side, between the first power transmission path and the second power transmission path. The clutch mechanisms include a forward clutch C1, a reverse brake B1 and a CVT drive clutch C2. The forward clutch C1 and the reverse brake B1 serve as a first clutch that connects or interrupts the first power transmission path (in other words, a first clutch that establishes the first power transmission path when the first clutch is engaged). The CVT drive clutch C2 serves as a second clutch that connects or interrupts the second power transmission path (in other words, a second clutch establishes the second power transmission path when the second clutch is engaged). The forward clutch C1, the reverse brake B1 and the CVT drive clutch C2 correspond to a separating device. Each of the CVT drive clutch C2, the forward clutch C1 and the reverse brake B1 is a known hydraulic friction engagement device (friction clutch) that is frictionally engaged by a hydraulic actuator. Each of the forward clutch C1 and the reverse brake B1 is one of the elements that constitute the forward/reverse switching device 26, as will be described later.

The torque converter 20 is provided around the input shaft 22 coaxially with the input shaft 22. The torque converter 20 includes a pump impeller 20p and a turbine runner 20t. The pump impeller 20p is coupled to the engine 12. The turbine runner 20t is coupled to the input shaft 22. A mechanical oil pump 42 is coupled to the pump impeller 20p. The oil pump 42 generates hydraulic pressure by being rotationally driven by the engine 12. The hydraulic pressure is used to control a shift of the continuously variable transmission 24, generate a belt clamping force in the continuously variable transmission 24, change the operation of each of the clutch mechanisms, or supply lubricating oil to portions of the power transmission path of the power transmission system 16.

The forward/reverse switching device 26 is provided around the input shaft 22 coaxially with the input shaft 22 in the first power transmission path. The forward/reverse switching device 26 includes a double-pinion-type planetary gear train 26p, the forward clutch C1 and the reverse brake B1. The planetary gear train 26p is a differential mechanism including three rotating elements, that is, a carrier 26c, a sun gear 26s and a ring gear 26r. The carrier 26c serves as an input element. The sun gear 26s serves as an output element. The ring gear 26r serves as a reaction element. The carrier 26c is integrally coupled to the input shaft 22. The ring gear 26r is selectively coupled to the housing 18 via the reverse brake B1. The sun gear 26s is coupled to a small-diameter gear 44. The small-diameter gear 44 is provided around the input shaft 22 coaxially with the input shaft 22 so as to be relatively rotatable. The carrier 26c and the sun gear 26s are selectively coupled to each other via the forward clutch C1. Thus, the forward clutch C1 is the clutch mechanism that selectively couples two of the three rotating elements to each other. The reverse brake B1 is the clutch mechanism that selectively couples the reaction element to the housing 18.

The gear mechanism 28 includes the small-diameter gear 44 and a large-diameter gear 48. The large-diameter gear 48 is provided around a gear mechanism counter shaft 46 coaxially with the gear mechanism counter shaft 46 so as to be relatively non-rotatable. The large-diameter gear 48 is in mesh with the small-diameter gear 44. The gear mechanism 28 includes an idler gear 50 and an output gear 52. The idler gear 50 is provided around the gear mechanism counter shaft 46 coaxially with the gear mechanism counter shaft 46 so as to be relatively rotatable. The output gear 52 is provided around the output shaft 30 coaxially with the output shaft 30 so as to be relatively non-rotatable. The output gear 52 is in mesh with the idler gear 50. The output gear 52 has a larger diameter than the idler gear 50. Therefore, the gear mechanism 28 is the gear mechanism having a gear ratio (gear stage) as a predetermined gear ratio (gear stage) in the power transmission path between the input shaft 22 and the output shaft 30. A dog clutch D1 is further provided around the gear mechanism counter shaft 46 between the large-diameter gear 48 and the idler gear 50. The dog clutch D1 selectively connects the large-diameter gear 48 to the idler gear 50 or disconnects the large-diameter gear 48 from the idler gear 50. The dog clutch D1 is an intermesh clutch that is provided in the power transmission system 16 (that is, the dog clutch D1 is interposed in the power transmission path between the engine 12 and the drive wheels 14) and that connects or interrupts the power transmission path from the sun gear 26s to the output shaft 30. The dog clutch D1 functions as a third clutch that is provided on the output shaft 30 side with respect to the forward clutch C1 and that connects or interrupts the first power transmission path.

Specifically, the dog clutch D1 includes a clutch hub 54, a clutch gear 56 and a cylindrical sleeve 58. The clutch hub 54 is provided around the gear mechanism counter shaft 46 coaxially with the gear mechanism counter shaft 46 so as to be relatively non-rotatable. The clutch gear 56 is arranged between the idler gear 50 and the clutch hub 54, and is fixed to the idler gear 50. The sleeve 58 is spline-fitted to the clutch hub 54. Thus, the sleeve 58 is provided so as to be relatively non-rotatable around the axis of the gear mechanism counter shaft 46 and relatively movable in a direction parallel to the axis. Internal teeth on the inner periphery of the sleeve 58 are spline-fitted to external teeth on the outer periphery of the clutch hub 54. The internal teeth on the inner periphery of the sleeve 58 are meshed with external teeth of the clutch gear 56 when the sleeve 58 is moved toward the clutch gear 56. When the sleeve 58 that is constantly rotated integrally with the clutch hub 54 is meshed with the clutch gear 56, the idler gear 50 and the gear mechanism counter shaft 46 are connected to each other. The dog clutch D1 includes a known synchromesh mechanism S1 that serves as a synchronization mechanism. The synchromesh mechanism S1 synchronizes rotations at the time of fitting the sleeve 58 to the clutch gear 56. In the thus configured dog clutch D1, the sleeve 58 is moved in a direction parallel to the axis of the gear mechanism counter shaft 46. Thus, the dog clutch D1 is changed between an engaged state and a released state.

In the power transmission system 16, when both the forward clutch C1 (or the reverse brake B1) and the dog clutch D1 are engaged in the first power transmission path, a forward power transmission path (or a reverse power transmission path) is established. Thus, the power of the engine 12 is transmitted from the input shaft 22 to the output shaft 30 via the gear mechanism 28. In the power transmission system 16, when at least both the forward clutch C1 and the reverse brake B1 are released or at least the dog clutch D1 is released, the first power transmission path is set to a neutral state (power transmission interrupted state) where transmission of power is interrupted.

The continuously variable transmission 24 is provided in a power transmission path between the input shaft 22 and the output shaft 30. The continuously variable transmission 24 includes a primary pulley 60, a secondary pulley 64 and a transmission belt 66. The primary pulley 60 is provided on the input shaft 22, and has a variable effective diameter. The secondary pulley 64 is provided on a rotary shaft 62 coaxial with the output shaft 30, and has a variable effective diameter. The transmission belt 66 is wound around the pair of variable pulleys 60, 64 so as to span between the pair of variable pulleys 60, 64. Power is transmitted via a friction force between the pair of variable pulleys 60, 64 and the transmission belt 66. In the continuously variable transmission 24, when the winding diameter (effective diameter) of the transmission belt 66 is changed as a result of a change in the V-groove width of each of the pair of pulleys 60, 64, a speed ratio (gear ratio) $\gamma$ (=Input shaft rotation speed Ni/Output shaft rotation speed No) is continuously changed. The CVT drive clutch C2 is provided on the drive wheels 14 side with respect to the continuously variable transmission 24 (that is, the CVT drive clutch C2 is provided between the secondary pulley 64 and the output shaft 30). The CVT drive clutch C2 selectively connects the secondary pulley 64 (rotary shaft 62) to the output shaft 30 or disconnects the secondary pulley 64 (rotary shaft 62) from the output shaft 30. In the power transmission system 16, when the CVT drive clutch C2 is engaged in the second power transmission path, the power transmission path is established. Thus, the power of the engine 12 is transmitted from the input shaft 22 to the output shaft 30 via the continuously variable transmission 24. In the power transmission system 16, when the CVT drive clutch C2 is released, the second power transmission path is set to a neutral state.

Figure 2:
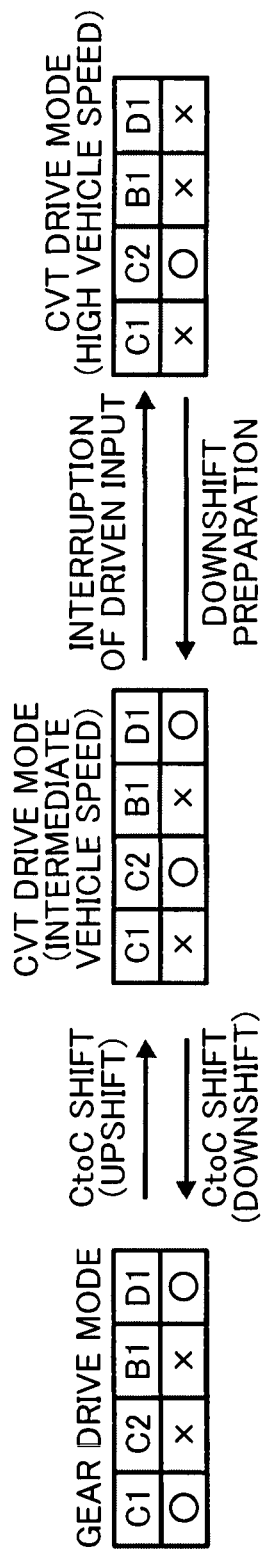
FIG. 2 is a view for illustrating changes in driving pattern of a power transmission system.

The operation of the power transmission system 16 will be described below. FIG. 2 is a view for illustrating changes in driving pattern of the power transmission system 16 by using an engagement chart of engagement elements for each driving pattern. In FIG. 2, C1 corresponds to the operation state of the forward clutch C1, C2 corresponds to the operation state of the CVT drive clutch C2, B1 corresponds to the operation state of the reverse brake B1, D1 corresponds to the operation state of the dog clutch D1, "O" indicates an engaged (connected) state, and "x" indicates a released (disconnected) state.

Initially, a gear drive mode that is the driving pattern in which the power of the engine 12 is transmitted to the output shaft 30 via the gear mechanism 28 (that is, the driving pattern in which power is transmitted through the first power transmission path) will be described. In this gear drive mode, as shown in FIG. 2, for example, the forward clutch C1 and the dog clutch D1 are engaged, while the CVT drive clutch C2 and the reverse brake B1 are released.

Specifically, when the forward clutch C1 is engaged, the planetary gear train 26p that constitutes the forward/reverse switching device 26 is integrally rotated, so the small-diameter gear 44 is rotated at the same rotation speed as the input shaft 22. The small-diameter gear 44 is in mesh with the large-diameter gear 48 provided on the gear mechanism counter shaft 46, so the gear mechanism counter shaft 46 is also rotated similarly. The dog clutch D1 is engaged, so the gear mechanism counter shaft 46 and the idler gear 50 are connected to each other. The idler gear 50 is in mesh with the output gear 52, so the output shaft 30 provided integrally with the output gear 52 is rotated. In this way, when the forward clutch C1 and the dog clutch D1 are engaged, the power of the engine 12 is transmitted to the output shaft 30 sequentially via the torque converter 20, the forward/reverse switching device 26, the gear mechanism 28, and the like. In this gear drive mode, for example, when the reverse brake B1 and the dog clutch D1 are engaged, and the CVT drive clutch C2 and the forward clutch C1 are released, reverse traveling is enabled.

Subsequently, a CVT drive mode that is the driving pattern in which the power of the engine 12 is transmitted to the output shaft 30 via the continuously variable transmission 24 (that is, the driving pattern in which power is transmitted through the second power transmission path) will be described. In this CVT drive mode, as shown in the CVT drive mode (high vehicle speed) of FIG. 2, for example, the CVT drive clutch C2 is engaged, while the forward clutch C1, the reverse brake B1 and the dog clutch D1 are released.

Specifically, when the CVT drive clutch C2 is engaged, the secondary pulley 64 and the output shaft 30 are connected to each other, so the secondary pulley 64 and the output shaft 30 are integrally rotated. In this way, when the CVT drive clutch C2 is engaged, the power of the engine 12 is transmitted to the output shaft 30 sequentially via the torque converter 20, the continuously variable transmission 24, and the like. The reason why the dog clutch D1 is released in the CVT drive mode (high vehicle speed) is to, for example, eliminate a drag of the gear mechanism 28, and the like, in the CVT drive mode and prevent high-speed rotation of the gear mechanism 28, the constituent members (for example, pinion gears) of the planetary gear train 26p, and the like, at a high vehicle speed.

The gear drive mode is, for example, selected in a low vehicle speed region including during a stop state of the vehicle. A gear ratio $\gamma1$ that is established by the first power transmission path (that is, a gear ratio EL that is established by the gear mechanism 28) is set to a value larger than a maximum gear ratio that can be established by the second power transmission path (that is, the highest gear ratio at the lowest vehicle speed that is established by the continuously variable transmission 24) $\gamma$max. For example, the gear ratio $\gamma1$ corresponds to a first-speed gear ratio $\gamma1$ that is the gear ratio of a first gear stage in the power transmission system 16, and the highest gear ratio $\gamma$max of the continuously variable transmission 24 corresponds to a second-speed gear ratio $\gamma2$ that is the gear ratio of a second gear stage in the power transmission system 16. Therefore, for example, the gear drive mode and the CVT drive mode are changed in accordance with a shift line for changing the gear stage between the first gear stage and the second gear stage in a shift map of a known stepped transmission. For example, in the CVT drive mode, a shift (for example, a CVT shift, a continuously variable shift) is carried out. In this shift, the gear ratio γ is changed on the basis of a traveling state, such as an accelerator operation amount and a vehicle speed, by using a known technique. In changing the driving pattern from the gear drive mode to the CVT drive mode (high vehicle speed) or changing the driving pattern from the CVT drive mode (high vehicle speed) to the gear drive mode, the change is carried out via a CVT drive mode (intermediate vehicle speed) shown in FIG. 2 transitionally.

For example, when the driving pattern is changed from the gear drive mode to the CVT drive mode (high vehicle speed), the driving pattern is transitionally changed from the gear drive mode to the CVT drive mode (intermediate vehicle speed). The gear drive mode is the state where the forward clutch C1 and the dog clutch D1 are engaged. The CVT drive mode (intermediate vehicle speed) is the state where the CVT drive clutch C2 and the dog clutch D1 are engaged. That is, a clutch engagement changing shift (for example, clutch-to-clutch shift (hereinafter, referred to as CtoC shift)) is carried out so as to release the forward clutch C1 and engage the CVT drive clutch C2. At this time, the power transmission path is changed from the first power transmission path to the second power transmission path, and the power transmission system 16 is substantially upshifted. After the power transmission path is changed, the dog clutch D1 is released in order to prevent an unnecessary drag of the gear mechanism 28, or the like, or high-speed rotation in the planetary gear train 26p (see interruption of driven input in FIG. 2). In this way, the dog clutch D1 functions as a driven input interrupting clutch that interrupts input from the drive wheels 14 side.

For example, when the driving pattern is changed from the CVT drive mode (high vehicle speed) to the gear drive mode, the driving pattern is transitionally changed from the CVT drive mode (high vehicle speed) to the CVT drive mode (intermediate vehicle speed) in preparation for changing the driving pattern to the gear drive mode (see downshift preparation in FIG. 2). The CVT drive mode (high vehicle speed) is the state where the CVT drive clutch C2 is engaged. The CVT drive mode (intermediate vehicle speed) is the state where the CVT drive clutch C2 is engaged and the dog clutch D1 is further engaged. In the CVT drive mode (intermediate vehicle speed), rotation is also transmitted to the sun gear 26s of the planetary gear train 26p via the gear mechanism 28. When a clutch engagement changing shift (for example, CtoC shift) is carried out so as to release the CVT drive clutch C2 and engage the forward clutch C1 from the CVT drive mode state (intermediate vehicle speed), the driving pattern is changed to the gear drive mode. At this time, the power transmission path is changed from the second power transmission path to the first power transmission path, and the power transmission system 16 is substantially downshifted.

Figure 3:
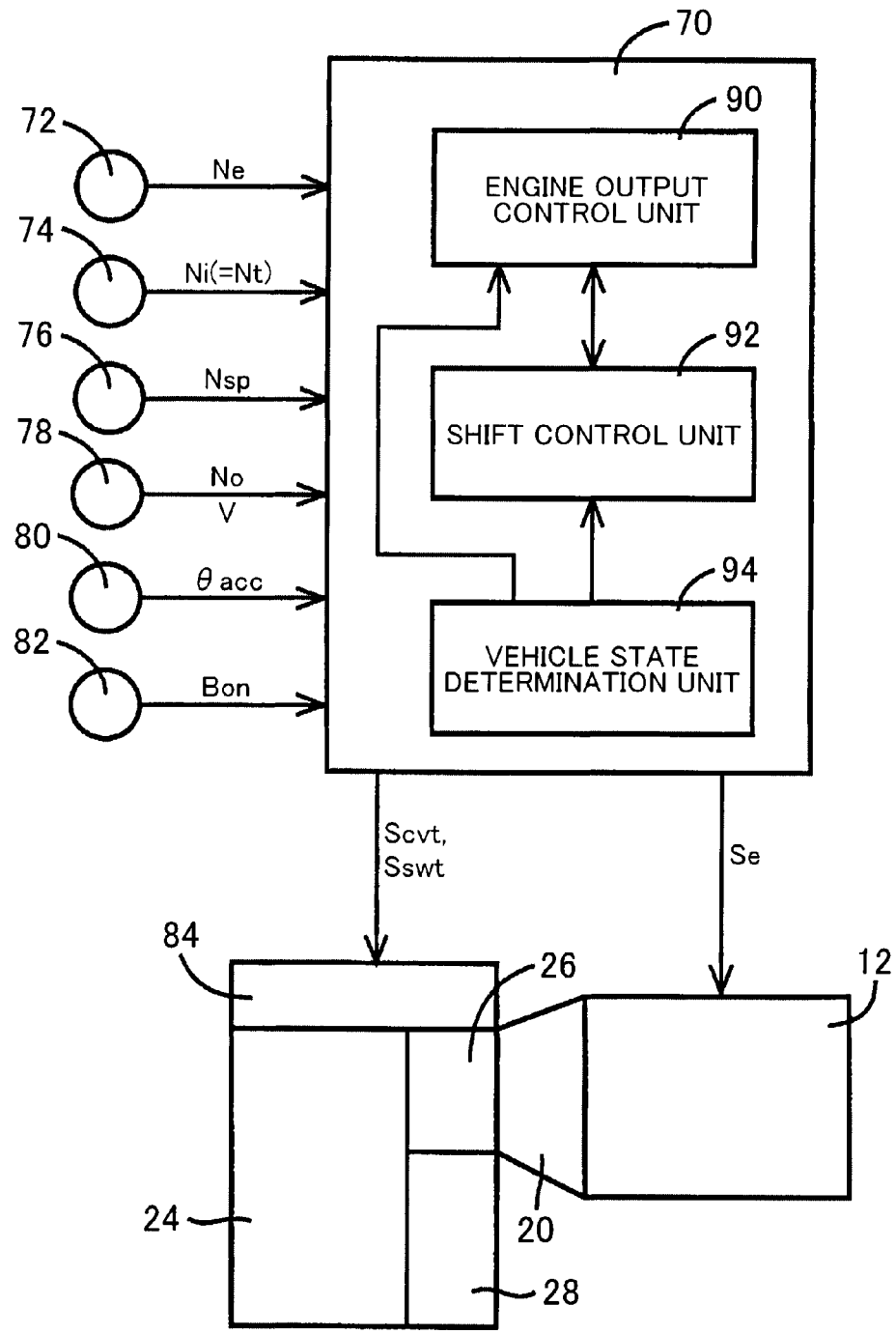
FIG. 3 is a view that illustrates a relevant portion of control functions and control system for various controls in the vehicle.

FIG. 3 is a view that illustrates a relevant portion of control functions and control system for various controls in the vehicle 10. As shown in FIG. 3, the vehicle 10 includes an electronic control unit 70 including, for example, a control unit for the vehicle 10. The control unit changes the driving pattern of the power transmission system 16. Thus, FIG. 3 is a view that shows input/output lines of the electronic control unit 70, and is a functional block diagram that illustrates a relevant portion of control functions implemented by the electronic control unit 70. The electronic control unit 70 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 70 is configured to execute output control over the engine 12, shift control and belt clamping force control over the continuously variable transmission 24, control for changing the driving pattern of the power transmission system 16, and the like. Where necessary, the electronic control unit 70 is split into an electronic control unit for controlling the engine, an electronic control unit for controlling a shift, and the like.

Various actual values based on detection signals of various sensors of the vehicle 10 are supplied to the electronic control unit 70. The various sensors include, for example, various rotation speed sensors 72, 74, 76, 78, an accelerator operation amount sensor 80, a foot brake switch 82, and the like. The various actual values include, for example, an engine rotation speed Ne, an input shaft rotation speed Ni, a secondary pulley rotation speed Nsp, an output shaft rotation speed No, an accelerator operation amount θacc, a brake operation signal Bon, and the like. The input shaft rotation speed Ni is a primary pulley rotation speed Npp and is also a turbine rotation speed Nt. The secondary pulley rotation speed Nsp is the rotation speed of the rotary shaft 62. The output shaft rotation speed No corresponds to the vehicle speed V. The accelerator operation amount θacc is the operation amount of an accelerator operation member as a driver's acceleration request amount. The brake operation signal Bon is a signal that indicates the state where a brake operation member for activating wheel brakes is operated. An engine output control command signal Se, a hydraulic control command signal Scvt, a hydraulic control command signal Sswt, and the like, are output from the electronic control unit 70. The engine output control command signal Se is used to control the output of the engine 12. The hydraulic control command signal Scvt is used to control hydraulic pressure associated with a shift of the continuously variable transmission 24. The hydraulic control command signal Sswt is used to control the forward/reverse switching device 26, the CVT drive clutch C2 and the dog clutch D1 associated with a change of the driving pattern of the power transmission system 16. For example, command signals, and the like, for respectively driving solenoid valves that control hydraulic pressures that are supplied to hydraulic actuators (not shown) of the forward clutch C1, the reverse brake B1, the CVT drive clutch C2 and the dog clutch D1 are output to a hydraulic control circuit 84 as the hydraulic control command signal Sswt.

The electronic control unit 70 includes an engine output control unit 90, that is, engine output control means, and a shift control unit 92, that is, shift control means.

The engine output control unit 90, for example, outputs the engine output control command signal Se to the throttle actuator, the fuel injection device and the ignition device in order to control the output of the engine 12. The engine output control unit 90, for example, calculates a required driving force Fdem as a driver's driving request amount on the basis of the actual accelerator operation amount θacc and the actual vehicle speed V by using a correlation (driving force map) empirically obtained or obtained by design and stored in advance (that is, predetermined). The engine output control unit 90 sets a target engine torque Tetgt for obtaining the required driving force Fdem. The engine output control unit 90 controls not only the open/close of the electronic throttle valve by the throttle actuator but also the fuel injection amount by the fuel injection device and the ignition timing by the ignition device so that the target engine torque Tetgt is obtained.

For example, in order to improve fuel economy, the engine output control unit 90 executes fuel cut control by outputting, to the fuel injection device, a fuel cut (F/C) command to stop supply of fuel to the engine 12 when a predetermined condition is satisfied. The predetermined condition for the fuel cut control is, for example, a condition that the vehicle is decelerating in an accelerator off state where it is determined that the accelerator operation amount θacc is zero and a predetermined delay time has elapsed from the traveling state where the engine rotation speed Ne exceeds a predetermined fuel cut start rotation speed and the engine rotation speed Ne is decreasing. For example, when the engine rotation speed Ne becomes lower than or equal to a predetermined fuel cut cancellation rotation speed as a result of deceleration of the vehicle during the fuel cut control, the engine output control unit 90 stops outputting the fuel cut (F/C) command, and cancels (ends) the fuel cut control. During the fuel cut control, a lockup clutch of the torque converter 20 is engaged in a slipping state or completely engaged.

For example, in order to improve fuel economy, the engine output control unit 90 executes automatic stop and restart control (idling stop control (hereinafter, referred to as idle stop control)) over the engine 12 on the basis of a predetermined condition when the vehicle 10 temporarily stops at an intersection, or the like. In the automatic stop and restart control, the engine 12 is automatically stopped temporarily and, after that, the engine 12 is automatically restarted without user's operation. Specifically, when the predetermined condition for executing the idle stop control is satisfied, the engine output control unit 90 starts the idle stop control by outputting an engine temporary stop command to the fuel injection device, and the like. The engine temporary stop command is a command to automatically stop the engine 12 temporarily by executing the fuel cut control, or the like. On the other hand, when the predetermined condition for executing the idle stop control is not satisfied during the idle stop control, the engine output control unit 90 cancels the idle stop control by outputting an engine restart command to the fuel injection device, and the like. The engine restart command is a command to automatically restart the engine 12 by executing cranking of the engine 12 with a starter (not shown), open-close control over the electronic throttle valve, fuel supply control, ignition timing control, and the like. The predetermined condition for executing the above-described idle stop control is, for example, a condition that the vehicle is stopped in a state where it is determined that the vehicle speed V is zero, the accelerator is off, warm-up of the engine 12 has completed, the brake operation signal Bon is output (particularly, in "D" position), and the like. The mechanical oil pump 42 is stopped during the idle stop control, so the hydraulic control circuit 84 may be configured such that oil does not rapidly drain from the hydraulic actuators or an electric oil pump that is able to supply hydraulic oil to such an extent that the amount of drain oil may be further provided although the electric oil pump is not able to supply hydraulic oil to such an extent that the released clutch mechanisms, and the like, are engaged.

In the CVT drive mode, the shift control unit 92 outputs the hydraulic control command signal Scvt to the hydraulic control circuit 84 so that the gear ratio γ becomes a target gear ratio γtgt. The hydraulic control command signal Scvt is used to control the gear ratio γ of the continuously variable transmission 24. The target gear ratio γtgt is calculated on the basis of the accelerator operation amount θacc, the vehicle speed V, and the like. Specifically, the shift control unit 92 has a predetermined correlation (for example, a CVT shift map, a belt clamping force map) by which the target gear ratio γtgt of the continuously variable transmission 24 is achieved while a belt slip of the continuously variable transmission 24 does not occur. The target gear ratio γtgt is set so that the operating point of the engine 12 is on a predetermined optimal line (for example, an engine optimal fuel consumption line). The shift control unit 92 determines command pressures (command values on the basis of the accelerator operation amount θacc, the vehicle speed V, and the like, by using the above correlation. The command pressures are respectively supplied to the hydraulic actuator of the primary pulley 60 and the hydraulic actuator of the secondary pulley 64. The shift control unit 92 outputs those command pressures to the hydraulic control circuit 84, and carries out a CVT shift.

The shift control unit 92 controls a change of the driving pattern between the gear drive mode and the CVT drive mode. Specifically, the shift control unit 92 determines whether to change the driving pattern in which the vehicle is traveling. For example, the shift control unit 92 determines whether to shift (change the gear ratio) on the basis of the vehicle speed V and the accelerator operation amount θacc by using an upshift line and a downshift line for changing the gear ratio between the first-speed gear ratio γ1 and the second-speed gear ratio γ2. The shift control unit 92 determines whether to change the driving pattern in which the vehicle is traveling on the basis of the determined result. The first-speed gear ratio corresponds to the gear ratio EL in the gear drive mode. The second-speed gear ratio corresponds to the highest gear ratio θmax in the CVT drive mode. The upshift line and the downshift line are, for example, predetermined shift lines, and have a predetermined hysteresis.

When the shift control unit 92 determines to change the driving pattern, the shift control unit 92 changes the driving pattern. For example, when the shift control unit 92 determines to upshift in the gear drive mode, the shift control unit 92 changes the driving pattern from the gear drive mode to the CVT drive mode (high vehicle speed). When the shift control unit 92 changes the driving pattern from the gear drive mode to the CVT drive mode (high vehicle speed), the shift control unit 92 initially carries out an upshift through a CtoC shift for releasing the forward clutch C1 and engaging the CVT drive clutch C2. This state corresponds to the CVT drive mode (intermediate vehicle speed) to which the driving pattern is transitionally changed in FIG. 2. The power transmission path in the power transmission system 16 is changed from the first power transmission path, through which power is transmitted via the gear mechanism 28, to the second power transmission path, through which power is transmitted via the continuously variable transmission 24. Subsequently, the shift control unit 92 changes the driving pattern to the CVT drive mode (high vehicle speed) by outputting a command to actuate the sleeve 58 so that the engaged dog clutch D1 is released.

When the shift control unit 92 determines to downshift in the CVT drive mode (high vehicle speed), the shift control unit 92 changes the driving pattern from the CVT drive mode (high vehicle speed) to the gear drive mode. When the shift control unit 92 changes the driving pattern from the CVT drive mode (high vehicle speed) to the gear drive mode, the shift control unit 92 initially changes the driving pattern to the CVT drive mode (intermediate vehicle speed) by outputting a command to actuate the sleeve 58 so that the released dog clutch D1 is engaged. Subsequently, the shift control unit 92 carries out a downshift through a CtoC shift for releasing the CVT drive clutch C2 and engaging the forward clutch C1. This state corresponds to the gear drive mode in FIG. 2. The power transmission path in the power transmission system 16 is changed from the second power transmission path, through which power is transmitted via the continuously variable transmission 24, to the first power transmission path, through which power is transmitted via the gear mechanism 28. In this way, when the shift control unit 92 changes transmission of power from transmission of power via the continuously variable transmission 24 to transmission of power via the gear mechanism 28 while the vehicle 10 is traveling, the shift control unit 92 actuates the dog clutch D1 to an engaged side and then releases the CVT drive clutch C2.

In change control for changing the driving pattern between the gear drive mode and the CVT drive mode, the change is carried out via the CVT drive mode (intermediate vehicle speed) transitionally, so the first power transmission path and the second power transmission path are changed only by exchanging torque through a CtoC shift. Therefore, a change shock is suppressed.

For example, in order to reduce an idling load of the engine 12, the shift control unit 92 executes neutral control on the basis of a predetermined condition. In the neutral control, transmission of power through the power transmission path is limited by placing the clutch mechanism, by which the power transmission path is established, in a semi-engaged state. Specifically, when the predetermined condition for executing the neutral control is satisfied while the vehicle 10 is stopped or decelerating in a state where the first power transmission path is established, the shift control unit 92 starts the neutral control for the first power transmission path by outputting, to the hydraulic control circuit 84, a hydraulic command to set the engaged forward clutch C1 to a semi-engaged state. On the other hand, when the predetermined condition for executing the neutral control becomes not satisfied during the neutral control, the shift control unit 92 cancels the neutral control for the first power transmission path by outputting, to the hydraulic control circuit 84, a hydraulic command to set the forward clutch C1 to a completely engaged state. The predetermined condition for executing the above-described neutral control, for example, includes the condition that the shift position is "D" position, the condition that the accelerator is off, the condition that the fuel cut control (which is synonymous with the idle stop control while the vehicle is stopped) is not executed, the condition that the engine 12 is at an idle, and the like. Particularly, while the vehicle is stopped, the predetermined condition further includes the condition that the brake operation signal Bon is output. While the vehicle is decelerating, the predetermined condition further includes the condition that the vehicle speed V is lower than or equal to a predetermined low vehicle speed.

In the vehicle 10 according to the present embodiment, even when the vehicle 10 is decelerating in a state where the second power transmission path is established, but when the predetermined condition for executing the above-described neutral control is satisfied, it is possible to start the neutral control for the second power transmission path. In such a case, unless the predetermined condition for executing the neutral control is not satisfied, it is conceivable that the vehicle comes to a stop while the neutral control for the second power transmission path is being executed. In such a situation, when the idle stop control is executed right after a stop of the vehicle, it is advantageous in terms of fuel economy, but there is a possibility that desired driving force or acceleration performance is not obtained because the vehicle will restart in the CVT drive mode. On one hand, when the power transmission path is changed to the state where the first power transmission path is established after a stop of the vehicle and then the idle stop control is executed, shortage of driving force at a restart can be avoided; however, it may be disadvantageous in terms of fuel economy. On the other hand, when the accelerator is set to an on state before a stop of the vehicle, there is a possibility that desired driving force or acceleration performance is not obtained because the vehicle will restart in the CVT drive mode.

For example, when the neutral control for the second power transmission path is started by setting the engaged CVT drive clutch C2 to a semi-engaged state while the vehicle 10 is decelerating in a state where the second power transmission path is established, the shift control unit 92 shifts into the neutral control for the first power transmission path by releasing the CVT drive clutch C2 and placing the released forward clutch C1 in a semi-engaged state before a stop of the vehicle.

More specifically, the electronic control unit 70 further includes vehicle state determination means, that is, a vehicle state determination unit 94. The vehicle state determination unit 94, for example, determines whether the vehicle speed V is lower than or equal to a predetermined vehicle speed. The predetermined vehicle speed is, for example, a predetermined transition determination threshold for determining whether to shift from the neutral control for the second power transmission path to the neutral control for the first power transmission path, and is a value lower than the predetermined low vehicle speed, which is one predetermined condition for executing the neutral control while the vehicle is decelerating. The predetermined vehicle speed is, for example, determined in advance such that a change from the semi-engaged state of the CVT drive clutch C2 to the semi-engaged state of the forward clutch C1 completes before a stop of the vehicle, and may be, for example, a vehicle speed for determining whether to change the driving pattern from the CVT drive mode to the gear drive mode in the above-described shift map. In addition, the vehicle state determination unit 94, for example, determines whether the vehicle speed V is zero.

When the vehicle state determination unit 94 determines that the vehicle speed V is lower than or equal to the predetermined vehicle speed while the neutral control for the second power transmission path is being executed, the shift control unit 92 shifts from the neutral control for the second power transmission path to the neutral control for the first power transmission path. The shift control unit 92 continues to execute the neutral control for the first power transmission path even after a stop of the vehicle. However, when the idle stop control is executed by the engine output control unit 90 after a stop of the vehicle, the shift control unit 92 cancels the neutral control for the first power transmission path. This is because the predetermined condition for executing the neutral control is not satisfied and is also to prepare for a restart by establishing the first power transmission path. During engine stop, no engine torque Te is output, and the forward clutch C1 is sufficiently allowed to be set to a completely engaged state even with a clutch pressure used at the time when the forward clutch C1 is placed in a semi-engaged state; however, in terms of control, it is desirable to once end the neutral control.

Incidentally, at the time of shifting from the neutral control for the second power transmission path to the neutral control for the first power transmission path, as in the case of the above-described change from the CVT drive mode to the gear drive mode, it is conceivable that the gear ratio γ of the continuously variable transmission 24 is set to the highest gear ratio γmax. However, when the above shift is prevented until the gear ratio γ of the continuously variable transmission 24 is returned to the highest gear ratio γmax, there is a possibility that the above shift does not complete before a stop of the vehicle.

The shift control unit 92 sets the gear ratio γ of the continuously variable transmission 24 at the time of shifting from the neutral control for the second power transmission path to the neutral control for the first power transmission path to a value smaller than the highest gear ratio γmax that can be established by the continuously variable transmission 24. For example, the gear ratio γ of the continuously variable transmission 24 at the time when the neutral control for the second power transmission path is started is set for this lower gear ratio. Alternatively, the gear ratio γ of the continuously variable transmission 24 is shifted toward the highest gear ratio γmax; however, the neutral control may shift into the neutral control for the first power transmission path by giving a higher priority to the fact that the vehicle speed V becomes lower than or equal to the predetermined vehicle speed rather than the fact that the gear ratio γ is at the highest gear ratio γmax. In this case, eventually, the gear ratio γ of the continuously variable transmission 24 at the time of the above shift is set to a gear ratio lower than the highest gear ratio γmax.

When the gear ratio γ of the continuously variable transmission 24 is not actively returned to the highest gear ratio γmax at the time of a shift of the neutral control as described above, the shift control unit 92 changes the gear ratio γ of the continuously variable transmission 24 toward the highest gear ratio γmax after shifting from the neutral control for the second power transmission path to the neutral control for the first power transmission path in order to return the gear ratio γ of the continuously variable transmission 24 to the highest gear ratio γmax as much as possible before a stop of the vehicle.

Figure 4:
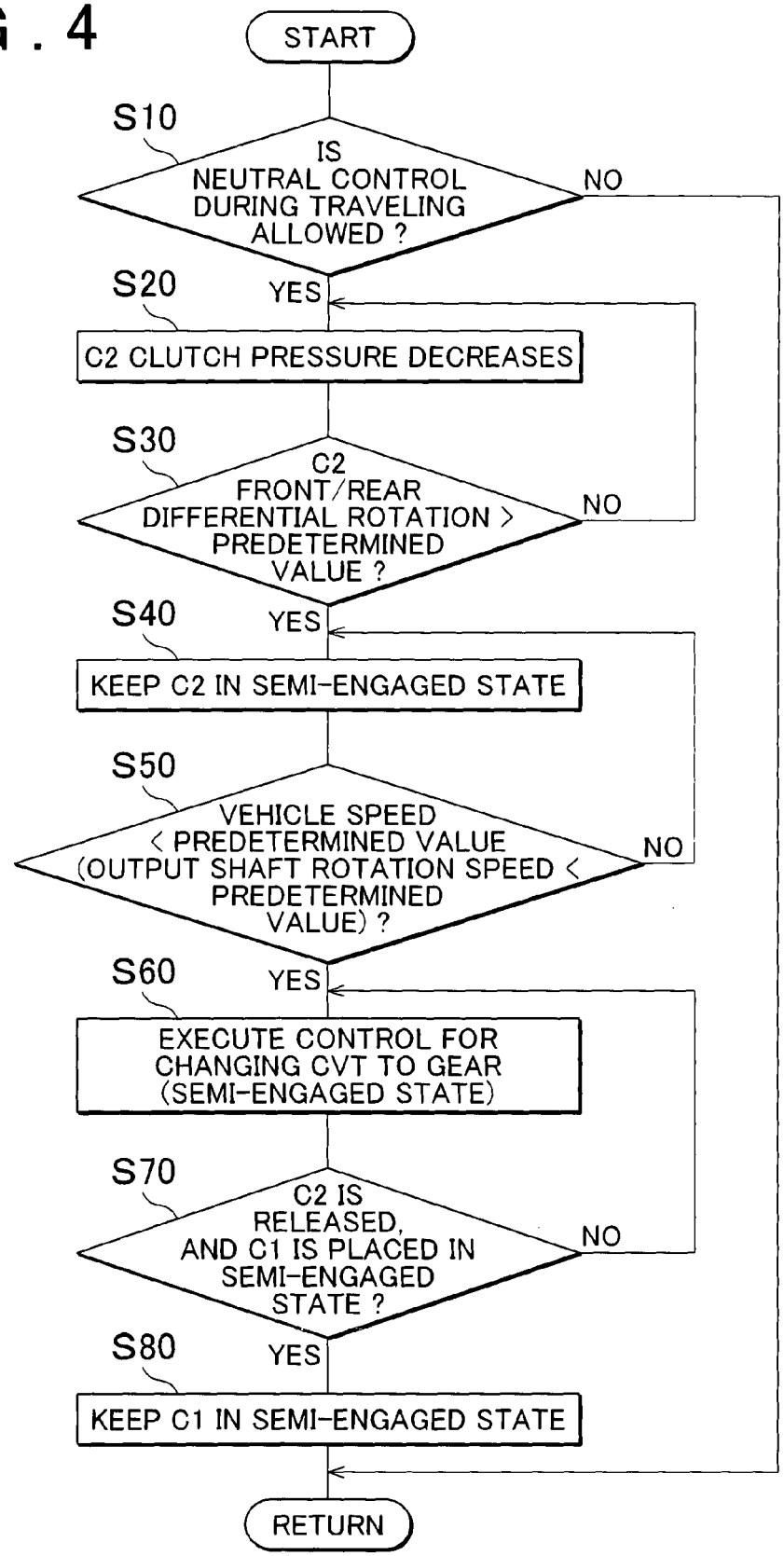
FIG. 4 is a flowchart that illustrates a relevant portion of control operations of an electronic control unit, that is, control operations for suppressing deterioration of fuel economy when neutral control is started while the vehicle is decelerating in a state where a second power transmission path through a continuously variable transmission is established.
Figure 5:
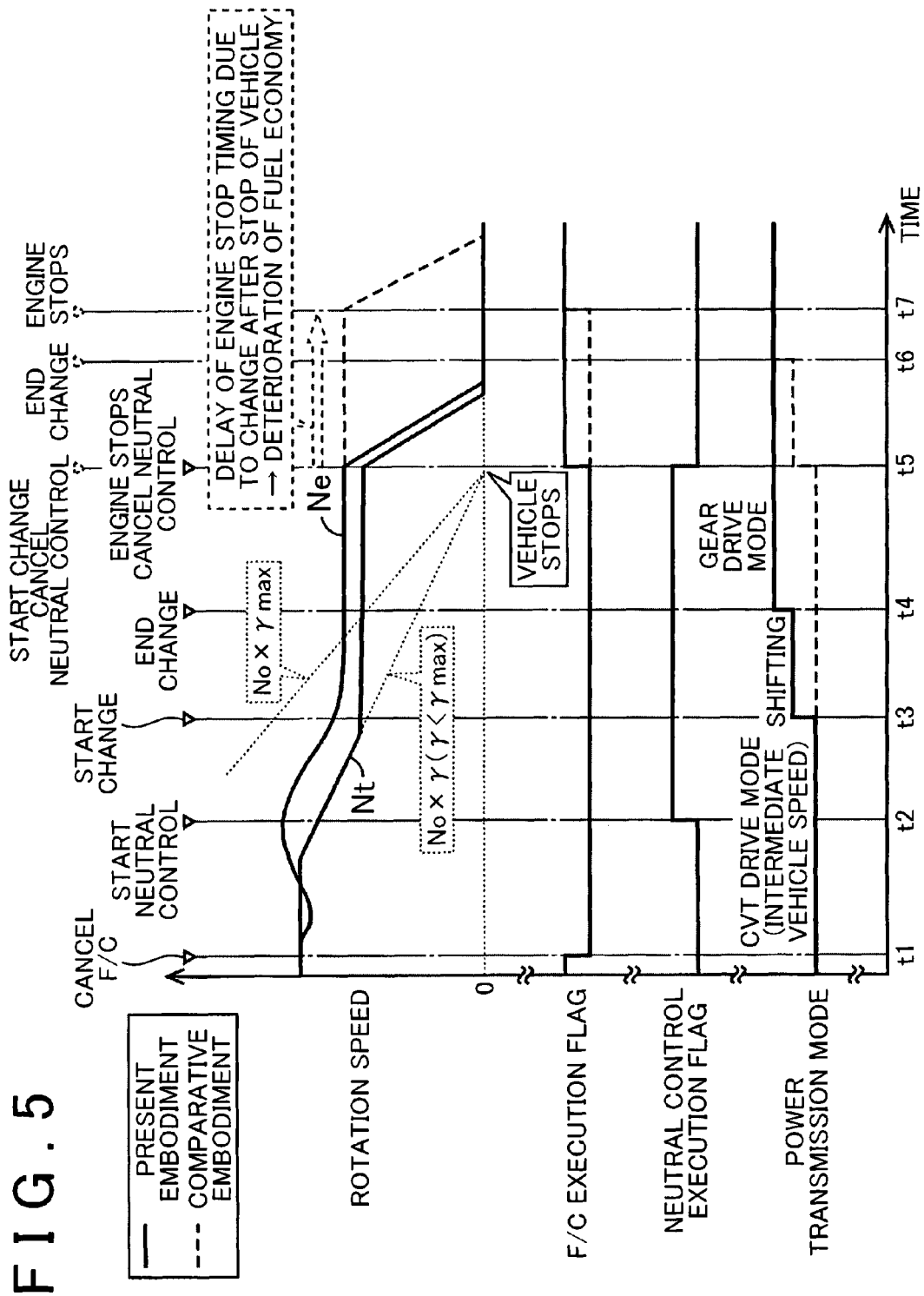
FIG. 5 is an example of a time chart in the case where the control operations shown in the flowchart of FIG. 4 are executed.

FIG. 4 is a flowchart that illustrates a relevant portion of control operations of the electronic control unit 70, that is, control operations for suppressing deterioration of fuel economy in the case where the neutral control is started while the vehicle is decelerating in a state where the second power transmission path through the continuously variable transmission 24 is established. FIG. 5 is an example of a time chart in the case where the control operations shown in the flowchart of FIG. 4 are executed.

In FIG. 4, initially, in step (hereinafter, step is omitted) S10 corresponding to the shift control unit 92, for example, whether the neutral control is allowed while the vehicle is traveling is determined on the basis of whether the predetermined condition for executing the neutral control while the vehicle is decelerating is satisfied. When negative determination is made in S10, the routine is ended. When affirmative determination is made in S10, in S20 corresponding to the shift control unit 92, for example, a command signal to reduce a C2 clutch pressure that is supplied to the hydraulic actuator of the CVT drive clutch C2 is output to the hydraulic control circuit 84 (see t2 timing in FIG. 5). Subsequently, in S30 corresponding to the shift control unit 92, for example, whether the CVT drive clutch C2 is released is determined on the basis of whether a front/rear differential rotation (=Nsp−No) of the CVT drive clutch C2 exceeds a predetermined value. When negative determination is made in S30, the process returns to S20. When affirmative determination is made in S30, in S40 corresponding to the shift control unit 92, for example, the C2 clutch pressure is regulated through feedback control so that the front/rear differential rotation of the CVT drive clutch C2 is set to a target front/rear differential rotation, and the CVT drive clutch C2 is kept in a semi-engaged state (see the t2 timing to t3 timing in FIG. 5). Subsequently, in S50 corresponding to the vehicle state determination unit 94, for example, it is determined whether the vehicle speed V is lower than or equal to the predetermined vehicle speed. When negative determination is made in S50, the process returns to S40. When affirmative determination is made in S50, in S60 corresponding to the shift control unit 92, for example, the neutral control is caused to shift from the neutral control for the second power transmission path to the neutral control for the first power transmission path (that is, the driving pattern is changed from the CVT drive mode to the gear drive mode while the clutch mechanism remains in the semi-engaged state) (see the t3 timing in FIG. 5). Subsequently, in S70 corresponding to the shift control unit 92, for example, it is determined whether the CVT drive clutch C2 is released and the forward clutch C1 is placed in a semi-engaged state (that is, whether the shift (change) started in S60 has completed). When negative determination is made in S70, the process returns to S60. When affirmative determination is made in S70, in S80 corresponding to the shift control unit 92, for example, the forward clutch C1 is kept in the semi-engaged state (see t4 timing to t5 timing in FIG. 5).

In FIG. 5, t1 timing indicates that the fuel cut control is cancelled. After that, at the t2 timing at which the vehicle is decelerating, the neutral control for the second power transmission path is started. The gear ratio γ of the continuously variable transmission 24 during the neutral control for the second power transmission path is kept at the gear ratio γ of the continuously variable transmission 24 at the timing at which the neutral control is started. With a decrease in the vehicle speed V, a change from the CVT drive mode to the gear drive mode is started at the t3 timing, and the change is completed at the t4 timing. After the start of the change, the gear ratio γ of the continuously variable transmission 24 is changed toward the highest gear ratio γmax (not shown). When the vehicle is caused to stop after completion of a change into the gear drive mode, the idle stop control is immediately started and, as a result, the engine 12 is caused to stop, and the neutral control is cancelled in response to the start of the idle stop control (t5 timing). On the other hand, in a comparative embodiment indicated by the dashed line, the vehicle is stopped while the driving pattern remains in the CVT drive mode after a start of the neutral control for the second power transmission path, and, after a stop of the vehicle, initially, the neutral control is cancelled, and a change from the CVT drive mode to the gear drive mode is started (t5 timing). Therefore, because the engine 12 is caused to stop (t7 timing) after completion of the change (t6 timing), there is a possibility that deterioration of fuel economy is incurred.

As described above, according to the present embodiment, when the neutral control is started by placing the CVT drive clutch C2 in a semi-engaged state while the vehicle is decelerating in a state where the second power transmission path is established, the clutch mechanism that is placed in a semi-engaged state in the neutral control while the vehicle is decelerating before a stop of the vehicle is changed from the CVT drive clutch C2 to the forward clutch C1. Therefore, it is possible to continue the neutral control until a stop of the vehicle. At a stop of the vehicle, the power transmission path that transmits the power of the engine 12 to the drive wheels 14 side is already changed to the first power transmission path in which the gear ratio EL higher than the highest gear ratio γmax that can be established by the second power transmission path. Thus, right after a stop of the vehicle, it is possible to execute the idle stop control. From the other way around, even when the idle stop control is executed right after a stop of the vehicle, it is possible to avoid shortage of driving force at a restart. Thus, in the vehicle 10, when the neutral control is started while the vehicle is decelerating in a state where the second power transmission path through the continuously variable transmission 24 is established, it is possible to suppress deterioration of fuel economy. From another viewpoint, even when the accelerator is set to an on state before a stop of the vehicle, re-acceleration is easily carried out in the gear drive mode, so desired driving force or acceleration performance is easily obtained.

According to the present embodiment, when the vehicle speed V is lower than or equal to the predetermined vehicle speed while the neutral control for the second power transmission path is being executed, the neutral control shifts from the neutral control for the second power transmission path to the neutral control for the first power transmission path. Thus, the clutch mechanism that is placed in a semi-engaged state in the neutral control while the vehicle is decelerating is appropriately changed from the CVT drive clutch C2 to the forward clutch C1 before a stop of the vehicle.

According to the present embodiment, the neutral control for the first power transmission path is cancelled in the case where the idle stop control is executed after a stop of the vehicle, so it is possible to prepare for a restart.

According to the present embodiment, the gear ratio γ of the continuously variable transmission 24 at the time of shifting from the neutral control for the second power transmission path to the neutral control for the first power transmission path is set to a lower gear ratio γ than the highest gear ratio γmax that can be established by the continuously variable transmission 24. Therefore, by changing the clutch mechanism that is placed in a semi-engaged state in the neutral control while the vehicle is decelerating from the CVT drive clutch C2 to the forward clutch C1 without returning the gear ratio γ of the continuously variable transmission 24 to the highest gear ratio γmax, it is possible to increase the probability that a change of the clutch mechanism completes before a stop of the vehicle (before the neutral control is cancelled). That is, it is possible to increase the probability that the idle stop control is started right after a stop of the vehicle.

According to the present embodiment, the gear ratio γ of the continuously variable transmission 24 is changed toward the highest gear ratio γmax after shifting from the neutral control for the second power transmission path to the neutral control for the first power transmission path. Therefore, it is possible to increase the probability that the gear ratio γ of the continuously variable transmission 24 is returned to the highest gear ratio γmax before a stop of the vehicle, so it is possible to prepare for a change of the power transmission path from the first power transmission path to the second power transmission path after a restart.

The embodiment of the invention is described in detail with reference to the drawings; however, the invention is also applicable to other alternative embodiments.

For example, in the time chart of FIG. 5 in the above-described embodiment, the fuel cut control is executed before the neutral control is started while the vehicle is traveling; however, the invention is not limited to this configuration. For example, such fuel cut control does not always need to be executed.

In the above-described embodiment, the dog clutch D1 is provided in the first power transmission path through the gear mechanism 28; however, the dog clutch D1 does not always need to be provided in terms of implementing the invention.

In the above-described embodiment, the gear mechanism 28 is a gear mechanism having a single gear stage; however, the gear mechanism 28 is not limited to this configuration. For example, the gear mechanism 28 may be a gear mechanism having a plurality of gear stages with different gear ratios γ. That is, the gear mechanism 28 may be a stepped transmission that is shifted into two or more stages.

In the above-described embodiment, in terms of the gear ratio γ, the gear mechanism 28 is the gear mechanism that establishes the gear ratio EL higher than the highest gear ratio γmax of the continuously variable transmission 24; however, the gear mechanism 28 is not limited to this configuration. For example, the gear mechanism 28 may be a gear mechanism that establishes a gear ratio EH lower than the highest gear ratio γmin of the continuously variable transmission 24 and the higher gear ratio EL. The invention can also be applied to the thus configured gear mechanism 28. This also applies to the case where the gear mechanism 28 is a gear mechanism having a plurality of gear stages.

In the above-described embodiment, the driving pattern of the power transmission system 16 is changed by using the predetermined shift map; however, the invention is not limited to this configuration. For example, the driving pattern of the power transmission system 16 may be changed by calculating a driver's driving request amount (for example, required torque) on the basis of the vehicle speed V and the accelerator operation amount θacc and then setting a gear ratio that satisfies the required torque.

In the above-described embodiment, the engine 12 is illustrated as the driving force source; however, the invention is not limited to this configuration. For example, an internal combustion engine, such as a gasoline engine and a diesel engine, is used as the driving force source. Instead, another prime motor, such as an electric motor, may be employed in combination with the engine 12, as the driving force source. The power of the engine 12 is transmitted to the continuously variable transmission 24 or the gear mechanism 28 via the torque converter 20; however, the invention is not limited to this configuration. For example, instead of the torque converter 20, another fluid transmission device, such as a fluid coupling having no torque amplification function, may be used. Alternatively, the fluid transmission device is not necessarily provided.

The above-described embodiment is only illustrative, and the invention may be implemented in modes including various modifications or improvements on the basis of the knowledge of persons skilled in the art.

What is claimed is:

1. A control apparatus for a vehicle, the vehicle including
   an engine,
   a drive wheel, and
   a power transmission system including
      an input rotating member to which power of the engine is transmitted,
      an output rotating member configured to output the power to the drive wheel,
      a continuously variable transmission provided between the input rotating member and the output rotating member, a gear mechanism provided in parallel with the continuously variable transmission between the input rotating member and the output rotating member, the gear mechanism including a gear stage, and a clutch mechanism configured to selectively change a power transmission path between a first path and a second path, the clutch mechanism including a first clutch and a second clutch, the first path being a path configured to transmit the power of the engine to the drive wheel via the gear mechanism when the first clutch is engaged, the second path being a path configured to transmit the power of the engine to the drive wheel via the continuously variable transmission when the second clutch is engaged, a speed ratio at a time when the power of the engine is transmitted by the first path being a low vehicle speed gear ratio higher than a lowest vehicle speed gear ratio at a time when the power of the engine is transmitted by the second path, the control apparatus comprising:

at least one electronic control unit configured to
  i) execute neutral control for limiting transmission of power through the power transmission path by placing the clutch mechanism in a semi-engaged state and idle stop control for temporarily stopping the engine during a stop of the vehicle based on a predetermined condition, and
  ii) when the neutral control for the second path is started by placing a engaged second clutch in a semi-engaged state while the vehicle is decelerating in a state where the power is being transmitted via the second path, shift into the neutral control for the first path by releasing the second clutch and placing a released first clutch in a semi-engaged state before a stop of the vehicle.

2. The control apparatus according to claim 1, wherein the electronic control unit is configured to, when a vehicle speed is lower than or equal to a predetermined vehicle speed while the neutral control for the second path is being executed, shift from the neutral control for the second path to the neutral control for the first path.

3. The control apparatus according to claim 1, wherein the electronic control unit is configured to, when the idle stop control is executed after a stop of the vehicle, cancel the neutral control for the first path.

4. The control apparatus according to claim 1, wherein the electronic control unit is configured to, in a state where a speed ratio of the continuously variable transmission mechanism is a speed ratio smaller than the highest vehicle speed gear ratio that is established by the continuously variable transmission mechanism, shift from the neutral control for the second path to the neutral control for the first path.

5. The control apparatus according to claim 4, wherein the electronic control unit is configured to, after shifting from the neutral control for the second path to the neutral control for the first path, change the speed ratio of the continuously variable transmission toward the highest vehicle speed gear ratio.

* * * * *